Jan. 9, 1951  J. E. CANDLIN, JR., ET AL  2,537,637
RAILWAY VEHICLE SUSPENSION
Filed Dec. 6, 1946  7 Sheets-Sheet 1

INVENTORS
JAMES E. CANDLIN JR.
AND
ROY W. BROWN
BY Ely & Frye
ATTORNEYS

Jan. 9, 1951 J. E. CANDLIN, JR., ET AL 2,537,637
RAILWAY VEHICLE SUSPENSION
Filed Dec. 6, 1946 7 Sheets-Sheet 2
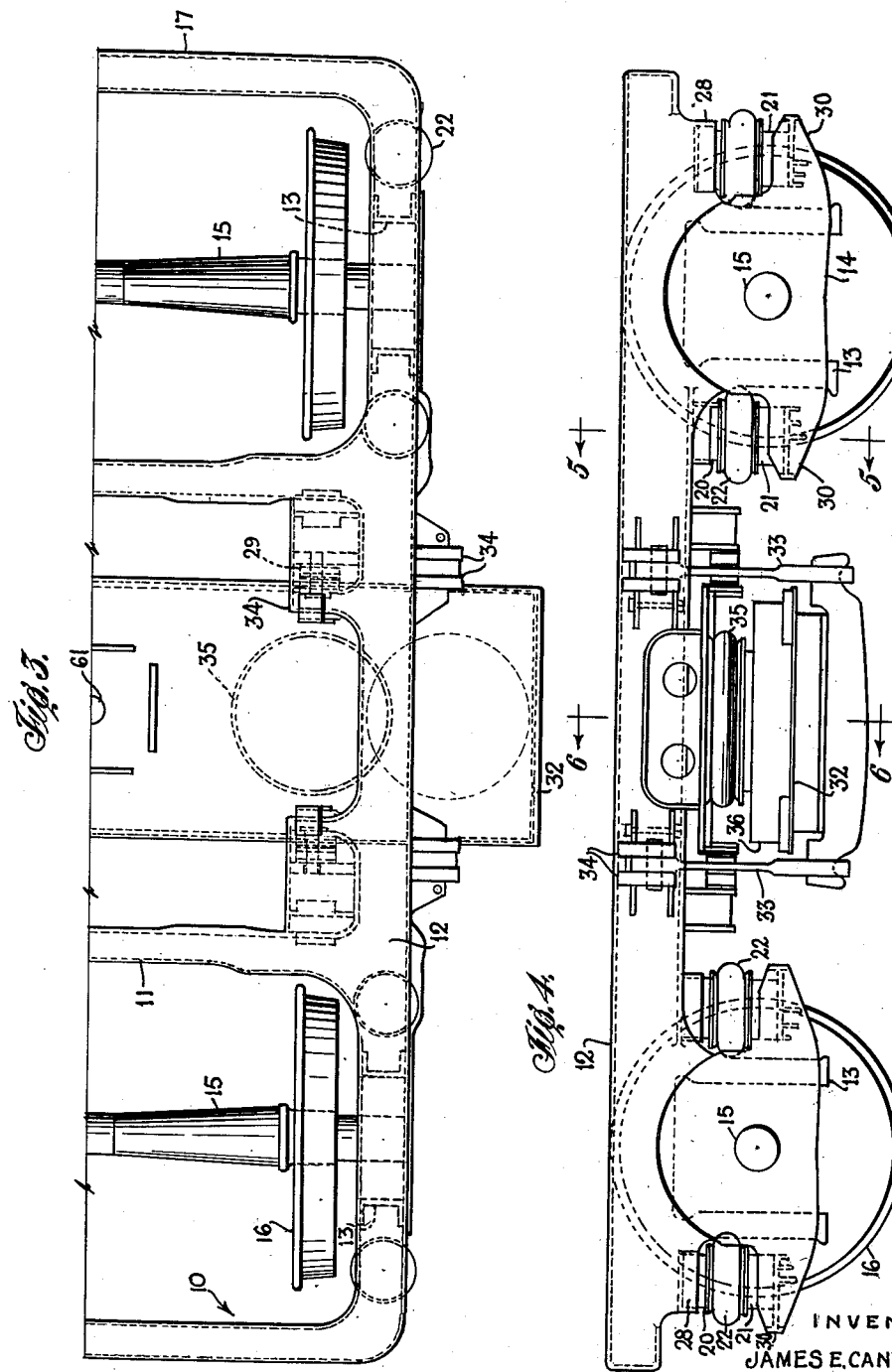

Jan. 9, 1951  J. E. CANDLIN, JR., ET AL  2,537,637
RAILWAY VEHICLE SUSPENSION

Filed Dec. 6, 1946  7 Sheets-Sheet 3

INVENTORS
JAMES E. CANDLIN JR.
AND
ROY W. BROWN
BY
Ely & Frye
ATTORNEYS

Jan. 9, 1951  J. E. CANDLIN, JR., ET AL  2,537,637
RAILWAY VEHICLE SUSPENSION
Filed Dec. 6, 1946  7 Sheets-Sheet 4

INVENTORS
JAMES E. CANDLIN JR.
AND
ROY W. BROWN
BY
Ely & Frye
ATTORNEYS

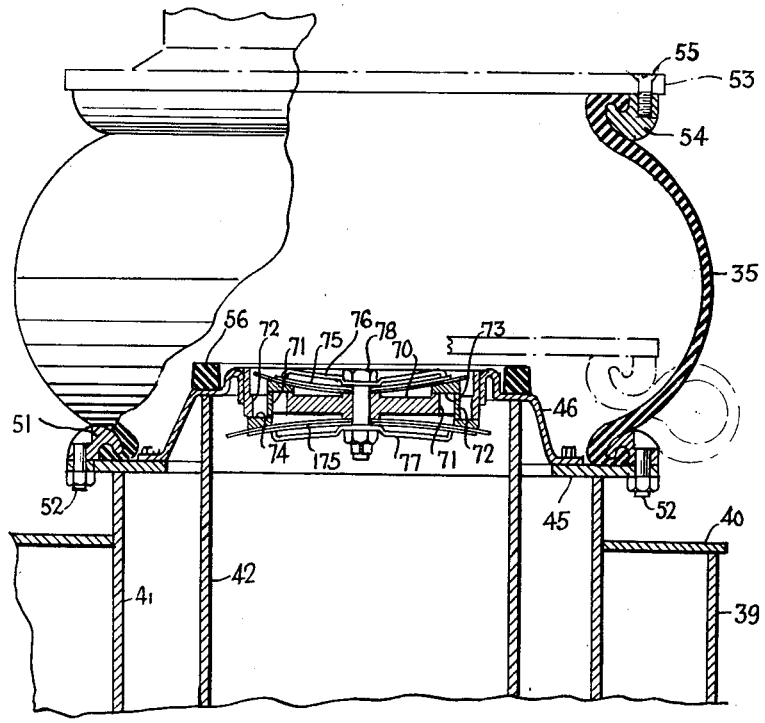

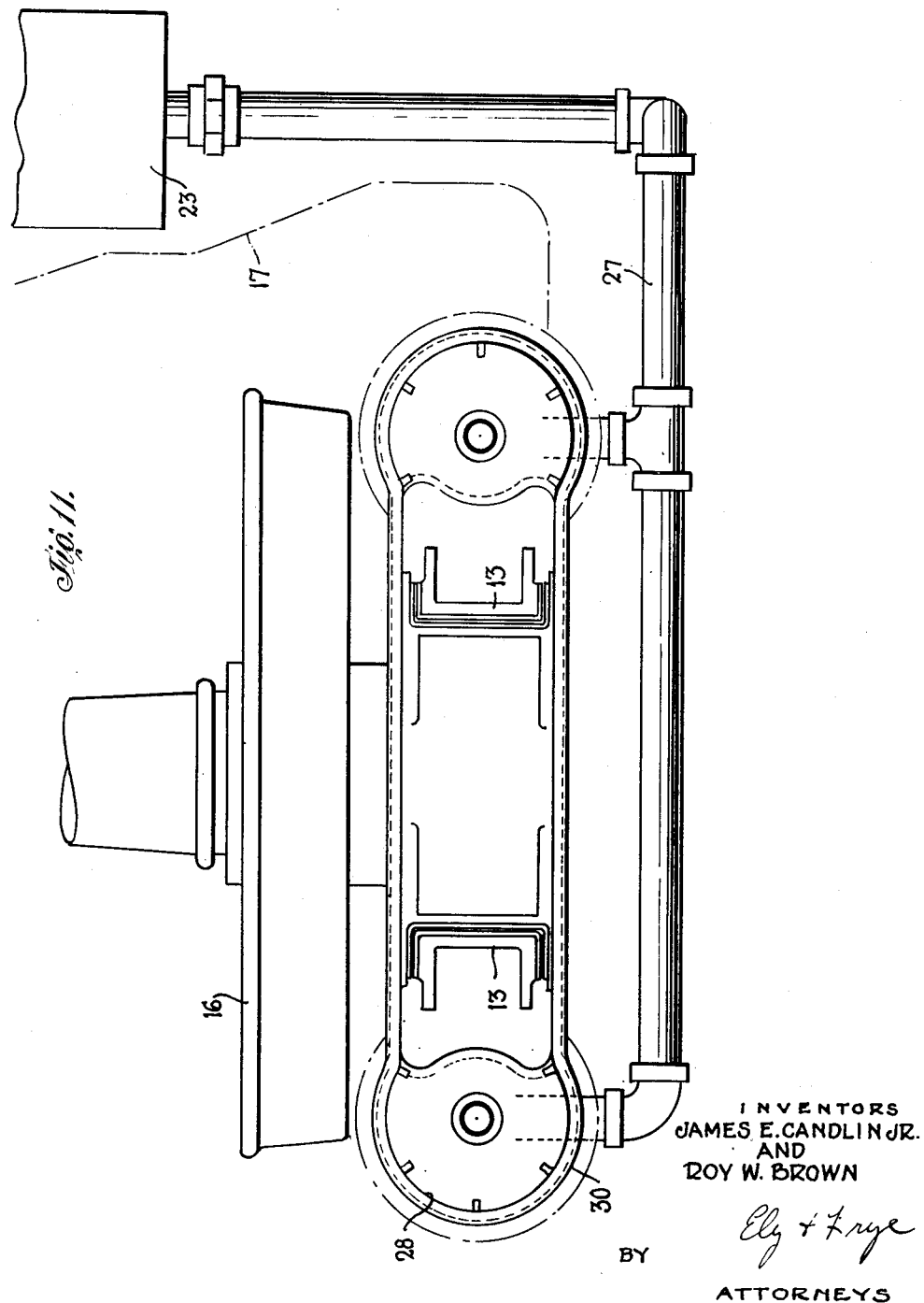

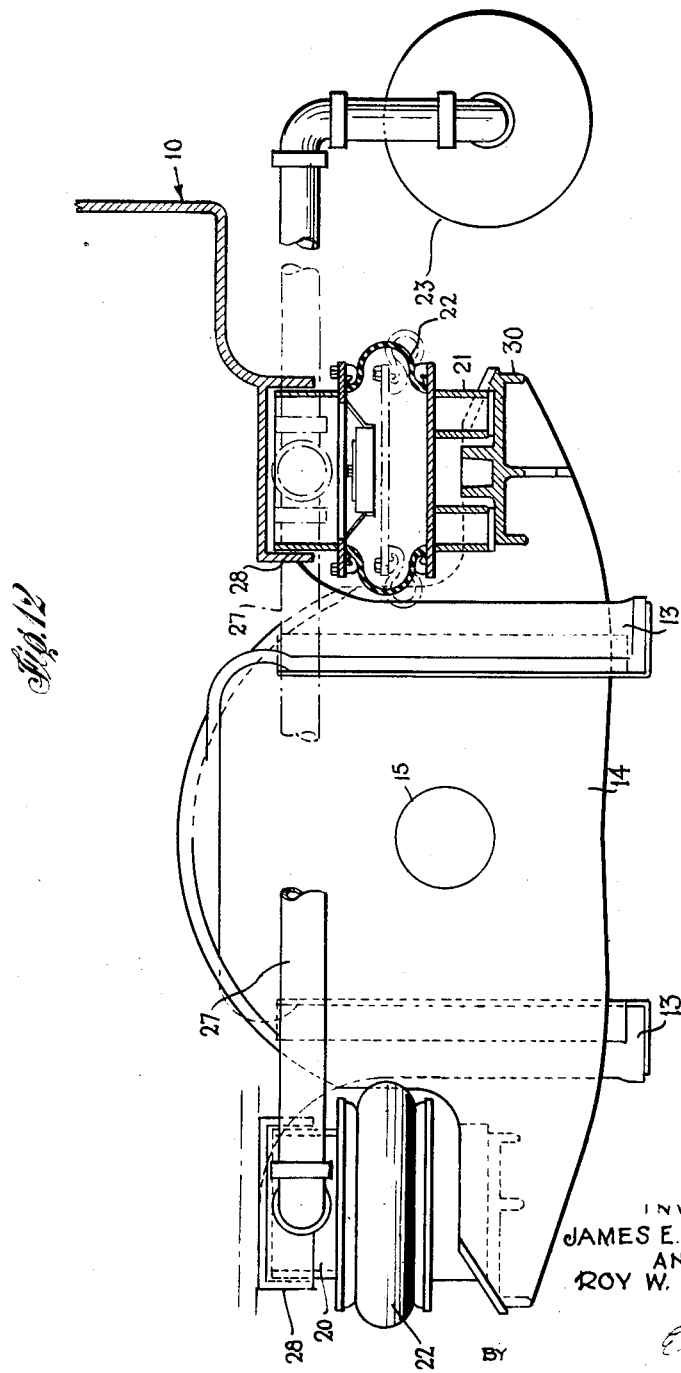

Patented Jan. 9, 1951

2,537,637

UNITED STATES PATENT OFFICE 2,537,637

RAILWAY VEHICLE SUSPENSION

James E. Candlin, Jr., Chicago, Ill., and Roy W. Brown, Akron, Ohio; said Brown assignor to The Firestone Tire & Rubber Company, Akron, Ohio, a corporation of Ohio, and said Candlin, Jr., assignor to Pullman-Standard Car Manufacturing Company, a corporation of Delaware Application December 6, 1946, Serial No. 714,584

4 Claims. (Cl. 267—65)

This invention relates to spring suspension for railway cars with particular reference to installations of non-metallic air springs of the bellows type in swiveling car trucks of the present embodiment.

The principal object is to provide a spring suspension designed to support the body of a car in present day high speed passenger train service in which safety, comfort and stability are of prime importance.

A further object of the invention is to reduce to a minimum the unsprung weight of the suspension and to adapt the arrangement for use in conjunction with journal boxes, bolsters, spring planks and side frames as employed in modern car truck construction.

Another object of the invention is to provide a spring suspension in which all of its parts are contained within the limits of size and movement prescribed by present railroad standard requirements.

A still further object of the invention is to provide a spring suspension in which auxiliary devices for the control of sidesway of the car body are dispensed with.

Another and important object is to provide a spring suspension in which means to prevent derailment of the truck is designed to permit cushioned support for the car body by portions of the spring installation in the event of failure of other of its parts.

The foregoing and other advantages looking to improved riding characteristics of railway car trucks and the reduction in weight of the spring suspension and equipment for use in light-weight high-speed trains, are achieved by the mechanism described in the specification and illustrated in the accompanying drawings, wherein Fig. 1 is a diagrammatic plan view of a car truck of the swiveling type arranged for the installation of non-metallic air springs at the bolster and journal box positions with the bolster spring positioned for outboard location of the bolster swing hangers;

Fig. 3 is a view similar to Fig. 1 but showing in enlarged scale and greater detail the type of truck frame construction employed for the accommodation of the air spring installation and the means provided for supporting air springs at the bolster position and at the journal boxes, with location of the bolster springs indicated for inboard and outboard positions of the swing hanger links;

Fig. 4 is a view similar to Fig. 2, showing the truck frame and journal boxes adapted for the accommodation of air springs of the bellows type and the mounting of bolster supporting air spring superimposed on its reservoir base resting upon the spring plank suspended from the truck frame.

Figure 6:
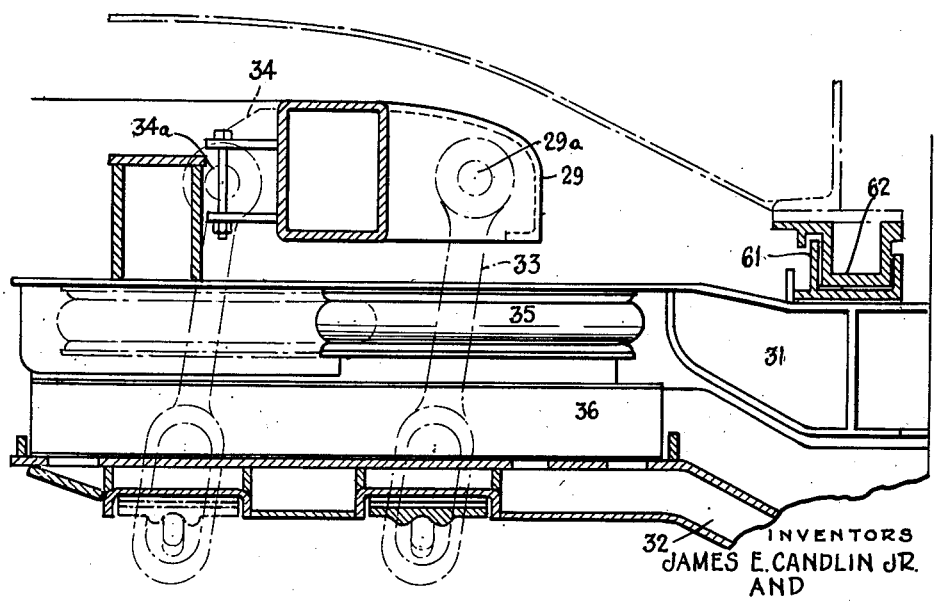
Figure 7:
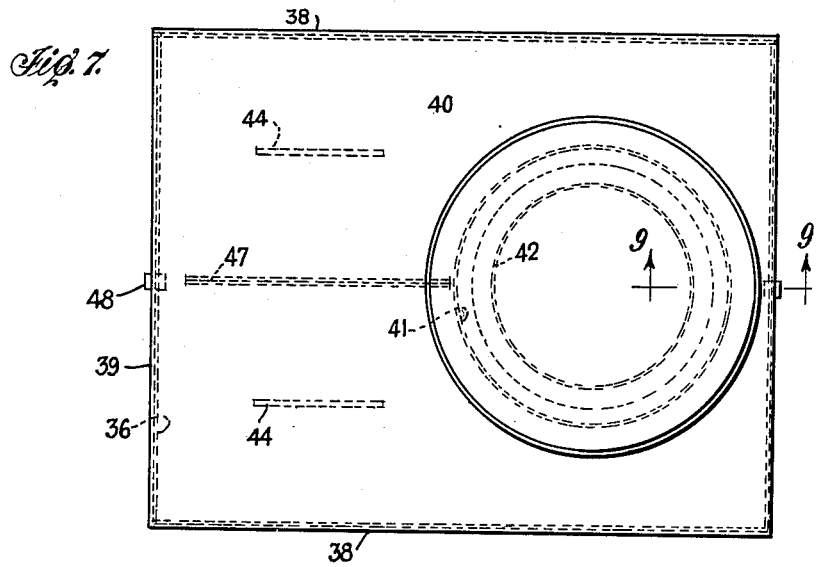
Figure 8:
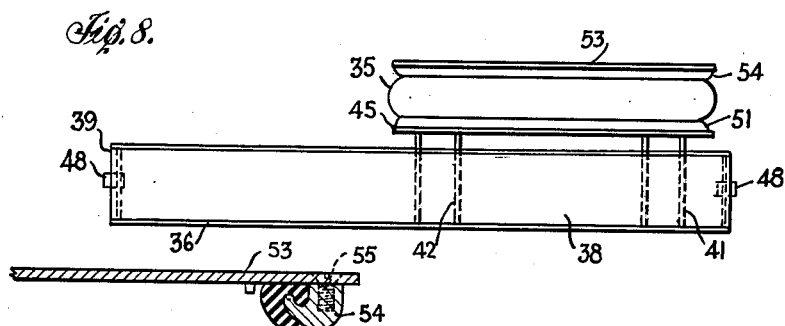
Figure 9:
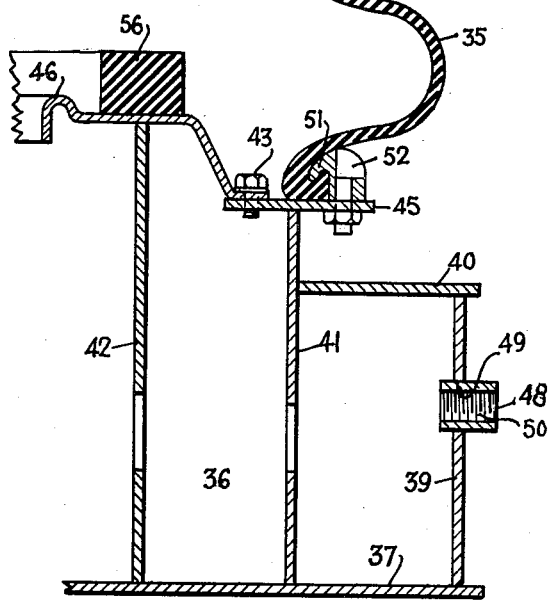

Fig. 6 is a similar view taken on line 6—6 of Fig. 4, showing a section longitudinally through the bolster and spring plank and depicting the bolster air spring bellows with its reservoir base supported upon the spring plank, the whole assembly being suspended from the truck frame by swing hangers, the spring bellows being shown by full lines in its position for use with swing hangers inboard and in broken lines for use with outboard hangers and, for which purpose, the reservoir base in the present embodiment, is reversed to shift the bellows, and showing also the relationship of the car body to the truck;

Fig. 7 is a plan view of the air spring bellows and base unit adapted, in the present embodiment, to be reversed 180 degrees to shift the bellows to one or the other of inboard or outboard positions of the bolster swing hangers with which it is to be used;

Fig. 8 is a front elevational view of the same;

Fig. 9 is an enlarged fragmentary vertical sectional view taken on line 9—9 of Fig. 7, showing the base plate of the spring bellows supported upon concentric columns extending upwardly from the floor of the reservoir and the positioning of the bumper ring above the inner of said columns;

Fig. 10 shows an air spring unit typical of the suspension in accordance with this invention with the spring bellows superimposed on the reservoir base and fitted with flow control port means intermediate the bellows and reservoir.

Fig. 11 is an enlarged fragmentary view in plan showing, in the present embodiment, the means for supplying air to the bellows from an exteriorly placed reservoir; and Fig. 12 is a side view of the assembly showing the spring on one wing of the journal box in elevation and the spring on the opposite wing in section vertically through the bellows and chambered upper and lower rigid portions and depicting the air supply pipe connecting the two springs at their upper ends and further showing the interfitting of such springs, truck frame and journal boxes, with the springs disposed in the plane of and beyond the pedestals of the truck frame.

In the drawings, 10 represents the truck frame structure as a whole, 11 the transoms connecting the frame sides 12, 13 the pedestal jaws for slidable engagement with the journal boxes 14 mounted upon axles 15 in wheels 16, as best shown in Figs. 1 through 6. The structure of the truck having the features named has been adapted for the installation of the form of air spring necessary to produce results peculiar to the present embodiment of the suspension. The particular type of spring herein disclosed embodies elements of the rubber air spring shown in patent to Roy W. Brown for Pneumatic Suspension Device No. 2,133,279 of October 18, 1938, modified for application to the truck assembly of this invention. In the application of the springs to the truck at the journal box positions the springs are formed with chambered upper and lower metallic or rigid members 20 and 21, respectively, and an intermediate, non-metallic flexible air bellows portion 22. The springs of each pair at each journal box 14 are charged with air from sources individual to the several pairs, such as the reservoirs 23 secured, in this embodiment, to the end sills 17 of the truck frame 10, and divided by wall 24 to provide air chambers 25 and 26 for connection with the springs at respectively adjacent journal boxes on opposite sides of the truck. The springs on opposite sides of the individual boxes 14 on one side of the truck are coupled by air supply pipes 27 leading to spring air chambers 20 and respective chambers 25 of the reservoirs, the springs on the opposite sides of the truck being supplied from air chambers 26 of said reservoirs by similar pipes, so that the air pressure in the springs on opposite sides of the several journal boxes will be equalized and maintained independently of the air supply for the other spring assemblies, thus to prevent bottoming of the truck frame upon the journal boxes in the event of failure of the springs at other of such assemblies. Obviously, and within the scope of the invention, the air reservoirs 23 at the end sills may be dispensed with and the air chambers 20 of the springs at the journal boxes could be coupled directly to adjacent reservoirs in the frame side portions 12, as an alternative disposition of the air supply. For the purpose of retaining the spring elements in position at the journal boxes 14, the boxes are formed or fitted with spring seat extensions 30 fore and aft of the boxes and the side frame 12 is formed or fitted with depending flange portions 28 peripherally engaging the upper chambered portions 20 of underlying journal box springs to hold them in fixed upright relationship with the truck frame and boxes to utilize fully the inherent self-damping characteristics of the bellows sections 22 of the springs and to insure unrestricted sliding engagement between the pedestals 13 and the boxes under thrust of train movement and the load of the car, thereby to develop the low rate spring deflection values of this type of spring to permit reduction in the free height of the springs and therefore of the truck itself with resultant lowering of the center of gravity of the car so desirable in high-speed streamlined train operation. The shock-absorbing and anti-body-rolling properties of the spring employed are self-contained in the load-carrying air-inflated bellows portion 22 of these springs and regulated by air-flow port control means between the bellows and reservoir and which may incorporate the valve mechanism disclosed in the Brown patent aforesaid.

Figure 1:
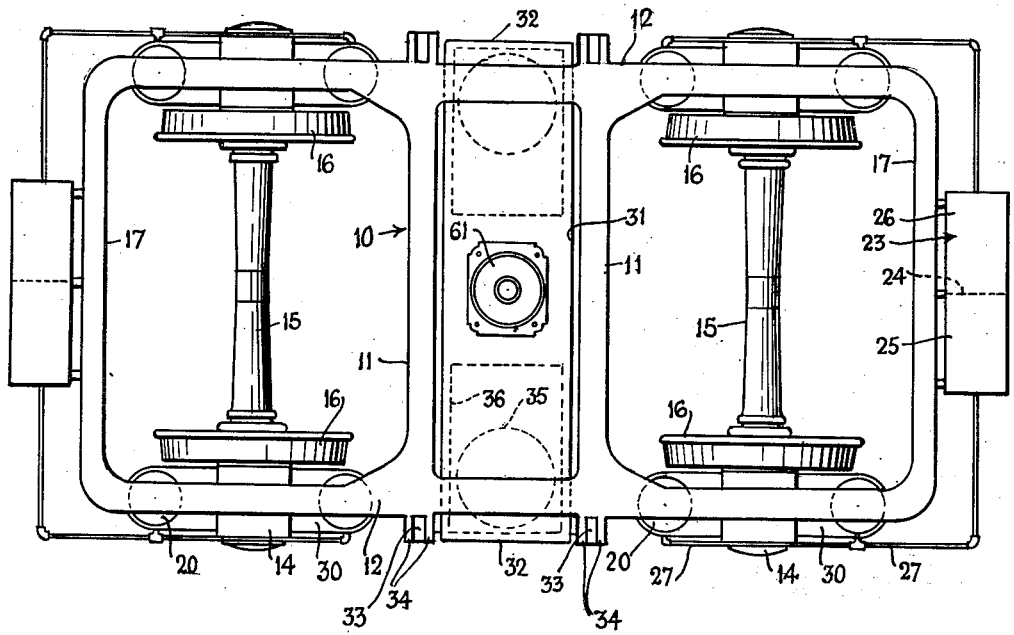
Figure 2:
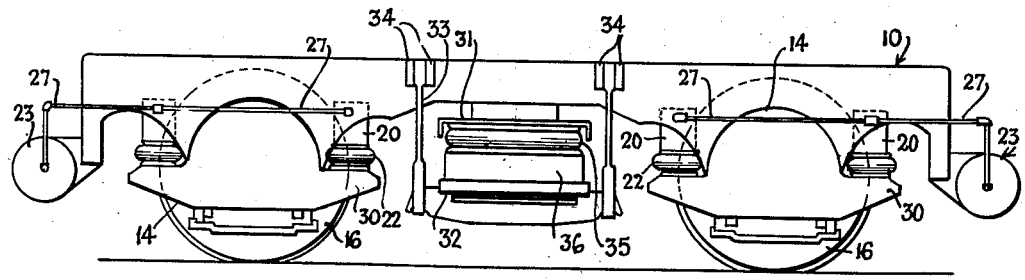
Fig. 2 is a side elevational view of the same and depicting diagrammatically the type of air springs employed at the bolter position and those supported upon the journal boxes, respectively, and the sources of air supply for the respective springs of the installation.
Figure 5:
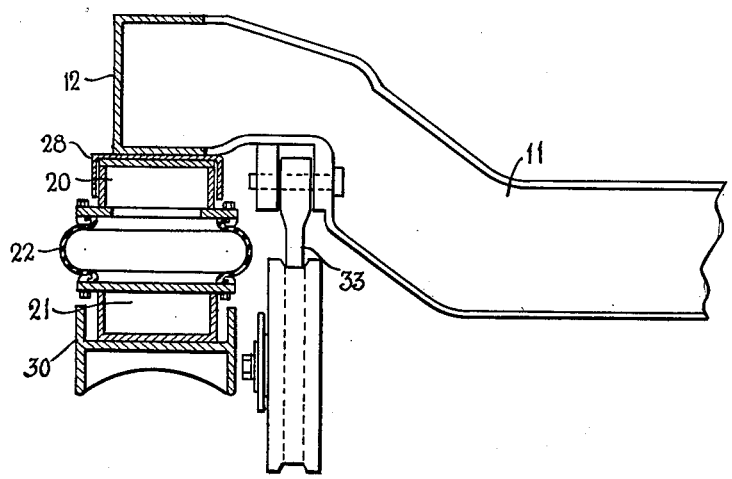
Fig. 5 is an enlarged vertical sectional view transversely of the truck taken on line 5—5 of Fig. 4, showing an air spring unit in assembled relationship with the journal box and truck frame members and depicting the manner of supporting the spring upon a wing of the journal box adapted to receive it.

Further to prevent the transmission of vibration from the wheels 16 to the car body through center bearing 61 on the truck bolster 31, additional cushioning means is introduced between the springs at the journal boxes and the bolster in the form of unitary spring assemblies supported beneath the ends of the bolster upon spring plank 32 suspended from truck frame transoms 11 by swing hangers 33 pivotally mounted in truck side frames 12, as best shown in Figs. 1 through 4 and 6. These springs are proportioned to function at relatively low frequencies designed to prevent synchronization with the springs at the journal boxes to avoid transmission of galloping movements to the bolster. The springs comprise the expansible non-metallic air bellows portion 35, superimposed on a rigid surge chamber 36 of relatively large volumetric capacity and of substantially rectangular configuration and having length, width and height proportioned to determine the required rate characteristic of the bellows portion supporting the bolster. In the present embodiment the swing hangers 33 are shown suspended from brackets 29 extending inwardly from the side frame 12 and the bellows 35 positioned to the right of the vertical central line through the surge chamber 36 as viewed in Fig. 6, but in circumstances requiring the placement of swing hangers 33 outboard the side frames 12 with the hangers supported from brackets 34 extending outwardly from the side frame 12 as indicated in Fig. 6, the bellows 35 will be positioned at the left of the vertical central line through said surge chamber, as viewed in this figure. The translation of the bellows 35 from the inboard position shown in full lines in Fig. 6, to the outboard position indicated in broken lines in this figure and in dotted lines in Fig. 1, is effected for the purposes of this embodiment, by the converse positioning of the spring base or surge chamber 36 upon the spring plank 32. In truck construction where one or the other location for the swing hangers has been determined upon, the surge tank or base of a given volumetric capacity may be positioned upon the spring plank to permit placement of the spring bellows portion 35 at a point as near centrally of the surge chamber 36 as practicable. As best shown in Figs. 8 and 9, the surge chamber 36 constitutes the base portion of the spring and is formed to support the bellows portion 35 and the load resiliently carried thereon. The base is of metal and of rugged construction comprising a floor plate portion 37, side wall plates 38, end wall plates 39, and top or cover plate portion 40, all of them edge-welded to form an air-tight container of a strength sufficient to withstand air pressures, in this embodiment, of about 90 pounds per square inch. For the purpose of supporting the bellows 35 with its imposed load, the base is fitted with supporting columns concentrically positioned upon the floor plate 37 and extending upwardly and through the cover plate 40, to a predetermined height above said plate for the support of the bellows. The base of the bellows comprises the ring plate section 45 supported upon the outer column 41 and a port control valve head plate member 46 supported upon the relatively higher inner column 42 and secured peripherally to the circumscribing ring plate section 45 by cap screws 43, or the like, both members being welded to their respective supporting columns, which themselves are welded to reservoir floor plate 37, the outer column 41 being further welded at an intermediate point to cover plate 40 for further stability, all as indicated in these figures. To further rigidify the reservoir structure to prevent bulging of the cover plate 40 under air pressure, tie plates 44 are edge welded to said plate and the floor plate 37 of the reservoir and extend in spaced relation lengthwise of the tank between an adjacent end wall 39 and outer column 41, and a relatively longer central rib plate 47 intermediate the tie plates 44 extending from said adjacent end wall 39 to said outer column member 41 and also edge welded to cover plate 40 and floor plate 37 of said reservoir 36. The reservoir is charged with air at the desired pressure from outside sources through couplings 48 secured in openings 49 in end walls 39 of the reservoir, the couplings being tapped, as at 50, to receive an air supply valve in a compressed air line. The expansible bellows portion 35 of the spring is held air tight to the base ring plate section 45 by bead ring 51 clamped to the base plate by L-head bolts 52, or the like, spaced at intervals about the ring. In similar fashion, the bellows is held to the spring cap plate 53 by bead ring 54 secured to the plate by machine screws 55, countersunk to facilitate assembly with the underside of the bolster 31. To prevent injury to the bellows under excessive load or because of insufficient air pressure in the spring assembly, rubber bumper ring 56 is provided to avoid complete collapse of the bellows by limiting downward movement of the spring cap plate 53 designed to support the load upon failure of the spring from any cause, but permitting adequate deflection of the bellows in the normal operation of the spring. The bumper ring is secured preferably to the valve head plate member 46 and disposed in the plan projection of the underlying inner column member 42 so that the thrust of the load upon the bumper will be transmitted through the column to the floor plate 37 of the surge chamber or reservoir 36, thence to the spring plank 32, to swing hangers 33, to truck side frame 12.

Under the thrust of loads tending to shift the bolster 31 from the normal position indicated in Fig. 6, a movement to the left would cause the inclined bolster swing hanger 33 on the side shown to assume a greater angularity with respect to the spring plank 32 to shorten the hanger arm and compress the bellows 35 under the increased load imposed, whereby the spring on the opposite side of the truck will be relieved of a part of its load by the lengthening of the bolster swing hanger on that side and resultant lowering of the adjacent end of the spring plank. As the hangers 33 move from their normal inclined position under the load imposed by the swing hanger pivot 34a on bracket 34 or 29a on outer bracket 29, as the case may be, the spring is compressed as the angularity of the swing hanger increases to oppose movement of the spring plank and bolster towards the adjacent truck side frame 12 by a thrust in the opposite direction under the pent-up energy of the spring. The force of the thrust upon said pivots subsides at a rate corresponding to the increase in the pressure on the spring until the limit of movement has been reached, whereupon the stored energy in the spring is released to restore the swing hangers, spring plank and bolster to their normal positions. In order to stabilize such movement to prevent excessive sidesway of the bolster and transmission of shock to the car body through truck bolster and body center bearings 61 and 62, respectively, shown in Fig. 6, the springs are fitted with control valve mechanism positioned between bellows 35 and surge chamber or reservoir 36 and may be of the type disclosed in the Brown patent aforesaid or the valve may take the form shown in Fig. 10 of the drawings, wherein a valve body 70 is provided that has two series of radially spaced ports 71 and 72 formed therein in spaced circumferential portions of the valve body. Then sealing rings 73 and 74, respectively, are provided for the series of valve ports 71 and 72 so as to control flow of air therethrough, with the sealing rings being retained in sealing association with the valve body by spring strips 75 and 175 that are secured against the rings 73 and 74, respectively, by means of spider members 76 and 77 drawn against the spring strips 75 and 175 by a bolt 78. The sealing ring 73 is positioned on the upper surface of the valve body while the sealing ring 74 is positioned on the lower part of the valve body whereby pressure on the upper surface of the valve body will force the sealing ring 74 out of engagement with the valve body and permit air flow down through the valve when sufficient pressure is exerted on the valve due to load thrust. Similarly, the sealing ring 73 is resiliently positioned against the upper surface of the valve body so that pressure on the lower surface of the valve body can force such sealing ring out of sealing engagement with the valve body. Since kinetic load conditions on the air spring bellows 35 will set up sudden increases in load on the valve, it is adapted to permit ready flow of air down through the ports 72 whereas flow of air upwardly through the valve, on rebound of the supported load, is controlled so as to be at a slower rate than flow downwardly through the valve whereby any desired differential of air flow through the valve may be set up by proper adjustment and arrangement of the springs 75 and 175. Air, of course, flowing through the valve, collects in the reservoir 36 for reflow upwardly through the valve into the air spring bellows.

The suspension utilizes springs of different frequencies, the vibrations set up at the wheels being offset by those occurring at the bolster and caused to be overlapped, thereby to prevent the building up of the combined recoil values of the springs at journal boxes and the bolster, so that the vibrations incident to the movement of the truck upon the rails will not be communicated to the car body. The tendency of the springs to upset under braking and starting thrusts or laterally when rounding curves will be minimized as a result of the lower center of gravity and lighter weight of the rubber air springs as distinguished from relatively high and heavier coil springs heretofore used.

What is claimed is:

1. In a rail car suspension, an air spring comprising a rigid metallic base portion of oblate configuration and having length, width and height to form a surge chamber of relatively large volumetric capacity, tubular columns extending upwardly in concentric relationship from the bottom of said chamber to above the upper side thereof, a non-metallic resilient portion forming a bellows section of substantially circular configuration and of lesser volumetric capacity than the surge chamber superimposed on said chamber, said bellows communicating with said chamber through a passage, a plate providing a base for said bellows section mounted on said columns, and air control valve mechanism in said passage intermediate said chamber and bellows section adapted to control the flow of air between said chamber and bellows.

2. In a rail car suspension, an air spring comprising a rigid metallic base portion of oblate configuration and having length, width and height to form a surge chamber of relatively large volumetric capacity, tubular columns extending upwardly in spaced concentric relationship from the bottom of said chamber to above the upper side thereof, a non-metallic resilient portion forming a bellows section of substantially circular configuration and of lesser volumetric capacity than the surge chamber superimposed on said chamber, said bellows communicating with said chamber through a passage, a plate providing a base for the bellows section mounted on said columns, air control valve mechanism in said passage intermediate said chamber and bellows section adapted to control the flow of air between said chamber and bellows, and a compression bumper piece mounted on said plate in thrust relationship with the innermost of said columns.

3. In a rail car suspension, an air spring comprising a rigid metallic base portion of oblate configuration and having length, width and height to form a surge chamber of relatively large volumetric capacity, tubular columns extending upwardly in spaced concentric relationship from the bottom of said chamber to above the upper side thereof, a non-metallic resilient portion forming a bellows section of substantially circular configuration and of lesser volumetric capacity than the surge chamber superimposed on said chamber, said bellows communicating with said chamber through a passage, a plate providing a base for the bellows section mounted on said columns, air control valve mechanism in said passage intermediate said chamber and bellows section adapted to control the flow of air between said chamber and bellows, and a compression bumper piece mounted on said plate in thrust relationship with the innermost of said columns about said mechanism.

4. In a rail car suspension, an air spring comprising a rigid metallic base portion forming a surge chamber of relatively large volumetric capacity, a tubular column extending upwardly from the bottom of said chamber to above the upper side thereof, a non-metallic resilient portion forming a bellows section of substantially circular configuration and of lesser volumetric capacity than the surge chamber superimposed on said chamber, said bellows communicating with said chamber through a passage, a base plate for said bellows mounted on said column, and means to control the flow of air between said chamber and bellows, and a compression bumper piece supported on said base plate in thrust relationship with said column.

JAMES E. CANDLIN, Jr.
ROY W. BROWN.

REFERENCES CITED

The following references are of record in the file of this patent:

UNITED STATES PATENTS

| Number | Name | Date |
|---|---|---|
| 1,130,656 | Annable | Mar. 2, 1915 |
| 2,021,797 | Martin | Nov. 19, 1935 |
| 2,129,910 | Christianson et al. | Sept. 13, 1938 |
| 2,180,860 | Brown | Nov. 21, 1939 |
| 2,226,605 | Geyer et al. | Dec. 31, 1940 |
| 2,284,253 | Baselt et al. | May 26, 1942 |

FOREIGN PATENTS

| Number | Country | Date |
|---|---|---|
| 307,154 | Great Britain | Mar. 7, 1929 |